(12) United States Patent
Takeda et al.

(10) Patent No.: US 10,552,314 B2
(45) Date of Patent: Feb. 4, 2020

(54) MEMORY SYSTEM AND METHOD FOR WARE LEVELING

(71) Applicant: Toshiba Memory Corporation, Minato-ku (JP)

(72) Inventors: Naomi Takeda, Yokohama (JP); Kenta Yasufuku, Yokohama (JP); Hiroshi Yao, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 15/914,604

(22) Filed: Mar. 7, 2018

(65) Prior Publication Data

US 2019/0087324 A1 Mar. 21, 2019

(30) Foreign Application Priority Data

Sep. 19, 2017 (JP) ................................. 2017-179593

(51) Int. Cl.
*G06F 12/02* (2006.01)
*G06F 3/06* (2006.01)

(52) U.S. Cl.
CPC ........ *G06F 12/0246* (2013.01); *G06F 3/0647* (2013.01); *G06F 3/0679* (2013.01); *G06F 2212/7201* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 8,407,410 B2 | 3/2013 | Abali et al. | |
| 2010/0281202 A1 | 11/2010 | Abali et al. | |
| 2011/0238890 A1 | 9/2011 | Sukegawa | |
| 2012/0311228 A1* | 12/2012 | Hsu ..................... | G06F 12/0246 711/102 |
| 2014/0082323 A1 | 3/2014 | Li | |
| 2014/0195725 A1 | 7/2014 | Bennett | |
| 2016/0147467 A1* | 5/2016 | Roberts ............... | G06F 12/0238 711/103 |
| 2016/0267014 A1* | 9/2016 | Doi .................... | G11C 13/0023 |

\* cited by examiner

*Primary Examiner* — Michael Alsip
(74) *Attorney, Agent, or Firm* — Oblon, McClelland, Maier & Neustadt, L.L.P.

(57) ABSTRACT

According to one embodiment, a memory system includes a non-volatile first memory, and a controller. The controller associates a first number of consecutive logical addresses with the first number of physical addresses which are included in a second number of consecutive physical addresses of the first memory. The controller executes a first updating and a second updating. The first updating includes associating a first physical address among the second number of physical addresses with a first logical address. The second updating includes obtaining a second logical address which is away from the first logical address by a value corresponding to distance information on the basis of origin information and the distance information and associating, with the second logical address, a second physical address which had been associated with the first logical address before the first updating is executed.

20 Claims, 10 Drawing Sheets

MEMORY SYSTEM AND METHOD FOR WARE LEVELING

CROSS-REFERENCE TO RELATED APPLICATIONS

This application is based upon and claims the benefit of priority from Japanese Patent Application No. 2017-179593, filed on Sep. 19, 2017; the entire contents of which are incorporated herein by reference.

FIELD

Embodiments described herein relate generally to a memory system and a method.

BACKGROUND

Conventionally, memory systems having a non-volatile memory have been known. When a logical address is designated from a host, a memory system obtains a physical address associated with the logical address and accesses a location in the non-volatile memory indicated by the physical address. When accesses are concentrated on a certain physical address, the location indicated by the certain physical address is exhausted more than other locations, and thus the life span of the non-volatile memory is reduced. In order to prevent this problem, a process of changing a correspondence between the logical address and the physical address is executed. This process may be referred to as "wear leveling."

DETAILED DESCRIPTION

According to the present embodiment, a memory system is connectable to a host. The memory system includes a non-volatile first memory, a controller and a second memory. The controller associates each of a first number of consecutive logical addresses with each of the first number of physical addresses in a one-to-one manner. The controller updates a correspondence between the first number of logical addresses and the first number of physical addresses. The first number of physical addresses are included in a second number of consecutive physical addresses of the first memory. The second number is at least one more than the first number. The second memory stores distance information and origin information indicating a physical address associated with a head logical address among the first number of logical addresses. The process of updating the correspondence includes a first updating and a second updating. The first updating is a process of associating a first physical address among the second number of physical addresses with a first logical address of the first number of logical addresses. The second updating is a process of obtaining, after first updating, a second logical address which is away from the first logical address by a value corresponding to the distance information among the first number of logical addresses on the basis f the origin information and the distance information and associating a second physical address among the second number of physical addresses with the second logical address. The second physical address is a physical address which had been associated with the first logical address before the first updating is executed.

A memory system and a method according to exemplary embodiments will be described in detail below with reference to the appended drawings. The present invention is not limited by such embodiments.

First Embodiment

Figure 1:
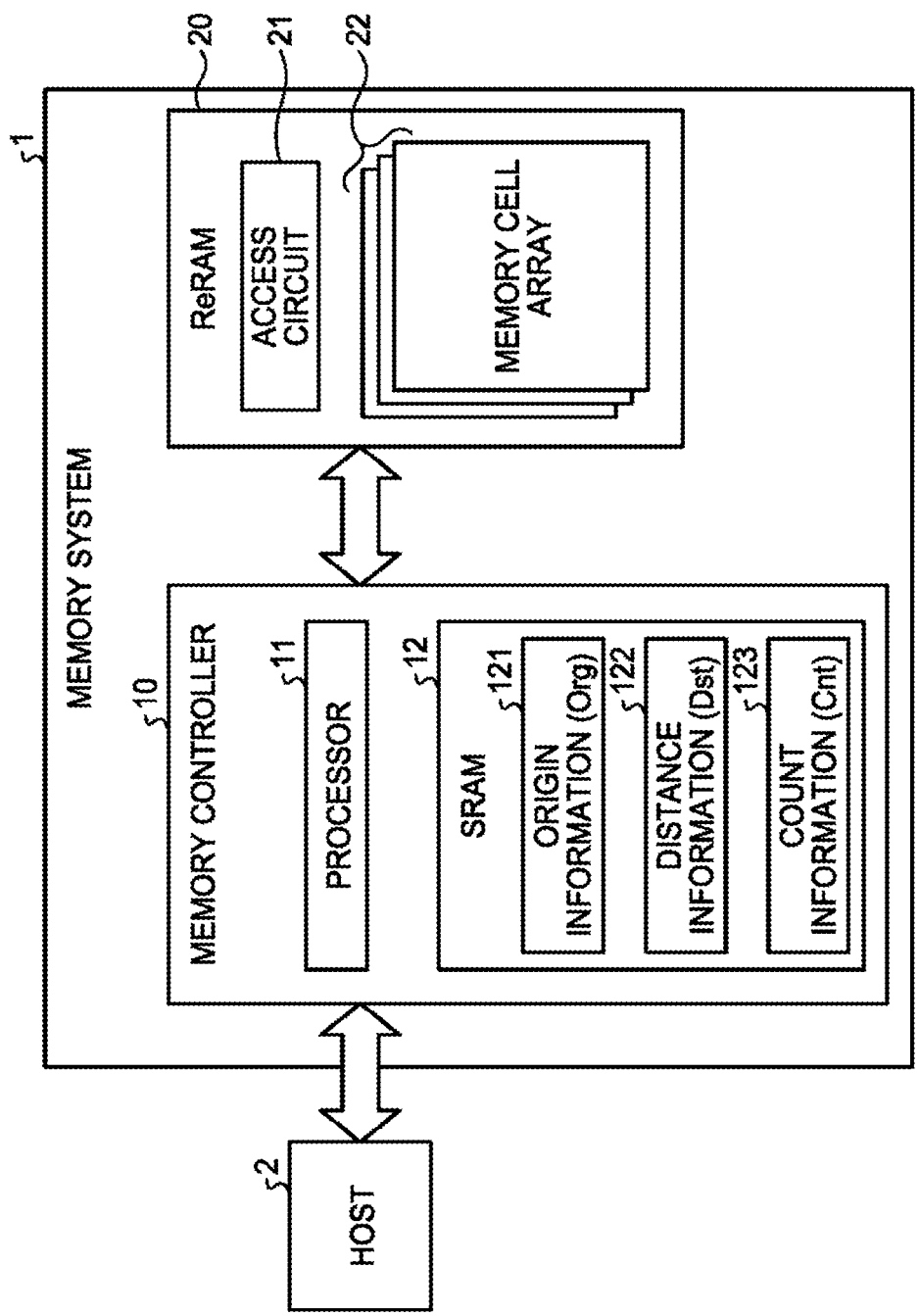
FIG. 1 is a diagram illustrating a configuration of a memory system according to a first embodiment.

FIG. 1 is a diagram illustrating a configuration of a memory system according to the first embodiment. A memory system 1 is connectable to a host 2. A standard of a communication path between the memory system 1 and the host 2 is not limited to a specific standard. As an example, a serial attached SCSI (SAS) may be employed.

The host 2 corresponds to, for example, a personal computer, a portable information terminal, server, or the like. The memory system 1 can receive an access commands (read commands and write commands) from the host 2. Each access command includes logical address indicating an access destination. The logical address indicates a location in a logical address space which is provided from the memory system 1 to the host 2.

The memory system 1 includes a memory controller 10 and a resistive random access memory (ReRAM) 20. The memory controller 10 executes data transfer between the host 2 and the ReRAM 20.

The ReRAM 20 includes an access circuit 21 and a memory cell array 22

The access circuit 21 is a circuit that executes data writing, data reading, and data erasing on the memory cell array 22 in response to an instruction from the memory controller 10. The access circuit 21 may not be configured to be capable of executing the data erasing. The access circuit 21 includes, for example, a row decoder, a sense amplifier, a voltage generating circuit, a column decoder, and a page register.

Figure 2:
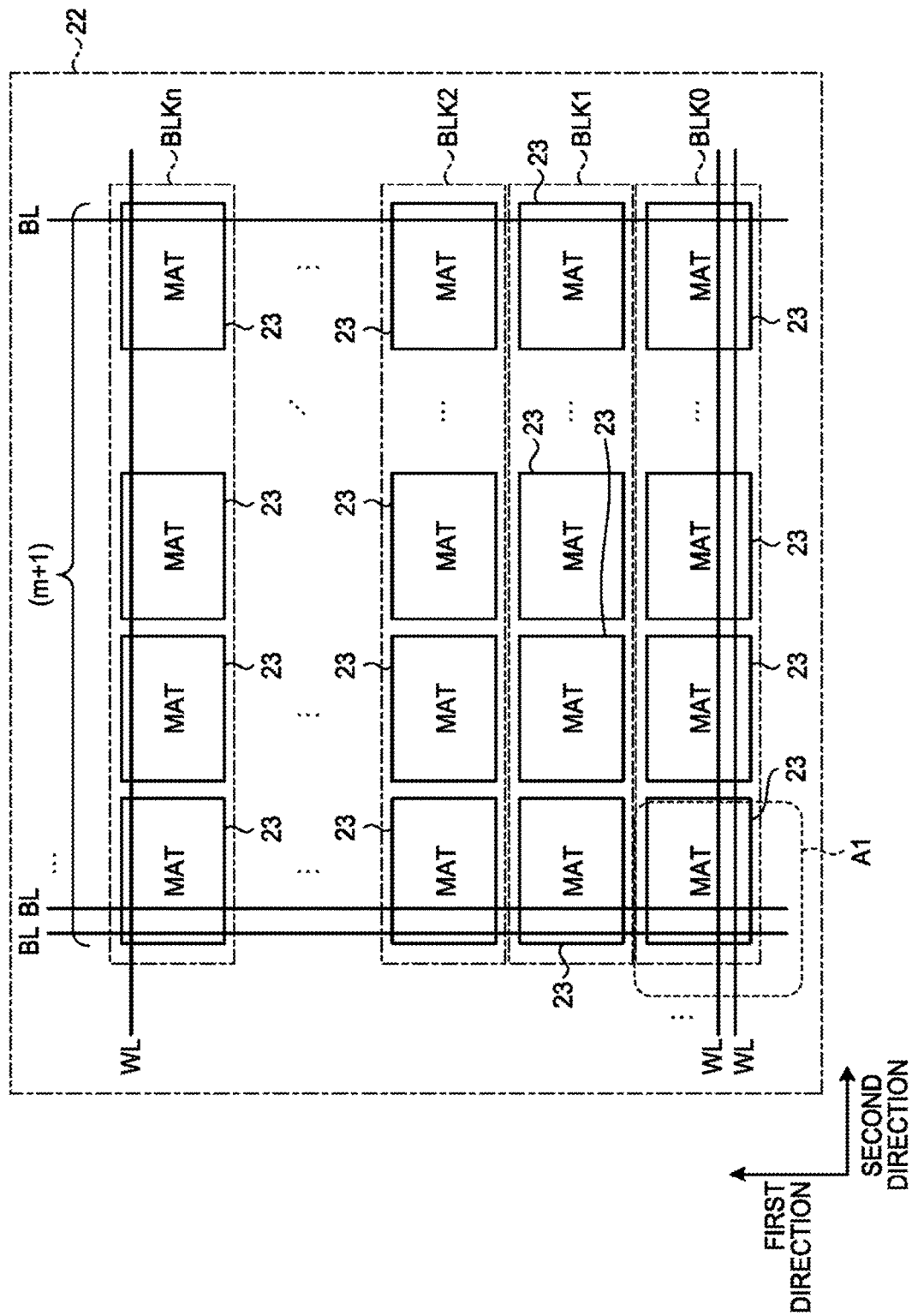
FIG. 2 is a diagram illustrating a configuration of a memory cell array according to the first embodiment.

The memory cell array 22 constitutes a storage area which is capable of storing data. FIG. 2 is a diagram illustrating a configuration of the memory cell array 22 according to the first embodiment. Here, FIG. 2 illustrates only one memory cell layer.

The memory cell array 22 includes a plurality of bit lines BL disposed in one direction (a first direction), a plurality of word lines WL disposed in another direction (a second direction) orthogonal to the first direction, and a plurality of memory cells MC disposed at crossing points of the bit lines EL and the word lines WL. A unit called a mat (MAT) 23 is constituted by a collection of a plurality of memory cells MC.

Each of the memory cells MC includes a rectifying device (diode) and a variable resistance element. A cathode of the diode is connected to the word line WL, and an anode of the diode is connected to the bit line EL via the variable resistance element. For example, the variable resistance element has a structure in which a recording layer and a protection layer are sequentially stacked on a diode.

In the memory cell array 22, a plurality of memory cells MC arranged in an identical row are connected to an identical word line WL, and a plurality of memory cells MC in an identical column are connected to an identical bit line BL. Further, a plurality of word lines WL, a plurality of bit lines BL, and a plurality of memory cells MC are disposed in a third direction orthogonal to both the first and second directions direction perpendicular to a surface of the semiconductor substrate). In other words, the memory cell array 22 has a structure in which the memory cells MC are three-dimensionally stacked. Each layer of the memory cell in the three-dimensional structure is referred to as a "memory cell layer." FIG. 2 illustrates only one memory cell layer.

The memory cell array 22 includes (m+1)×(n+1) mats 23 arranged in a matrix form. Each of "m" and "n" is a natural number of 1 or more. As described above, each of the mats 23 includes a plurality of memory cells MC arranged in a matrix form. For example, one mat 23 includes, for example, 16 word lines WL and 16 bit lines BL. In other words, (16×16) memory cells MC are included in one mat 23. 16×(m+1) bit lines EL and 16×(n+1) word lines WL are included in the memory cell array 22. A plurality of mats 23 in an identical row (that is, the mats 23 sharing a word line WL) constitute a block BLK. Therefore, the memory cell array 22 is constituted by blocks BLK 0 to BLKn. Hereinafter, when the blocks BLK 0 to BLKn are not distinguished, they are referred to simply as "blocks."

The number of mats 23 included in one memory cell layer is not limited to a specific number. A single memory cell layer may contain only one mat 23 or may include a plurality of mats 23. Further, the number of memory cells MC included in one mat 23 is not limited to (16×16).

Figure 3:
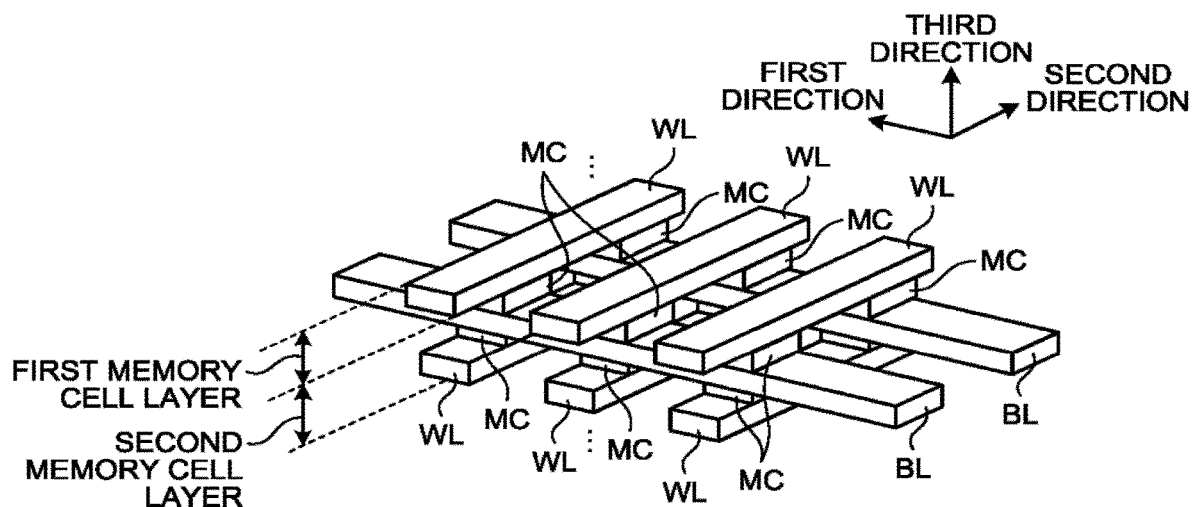
FIG. 3 is a perspective view of a partial area of the memory cell array according to the first embodiment.

FIG. 3 is a perspective view of a partial area of the memory cell array 22 and illustrates an example in which the memory cell array 22 having the above configuration is three-dimensionally configured. In the memory cell array 22, a plurality of layers (a first memory cell layer, a second memory cell layer, are stacked in a direction perpendicular to the substrate surface of the semiconductor substrate (the third direction). According to FIG. 3, a word line WL, a memory cell MC, a bit line BL, a memory cell MC, a word line WL, and . . . are formed in the described order. However, sets of a word line WL, a memory cell MC, and a bit line EL may be stacked with an inter-layer insulating film interposed therebetween.

Figure 4:
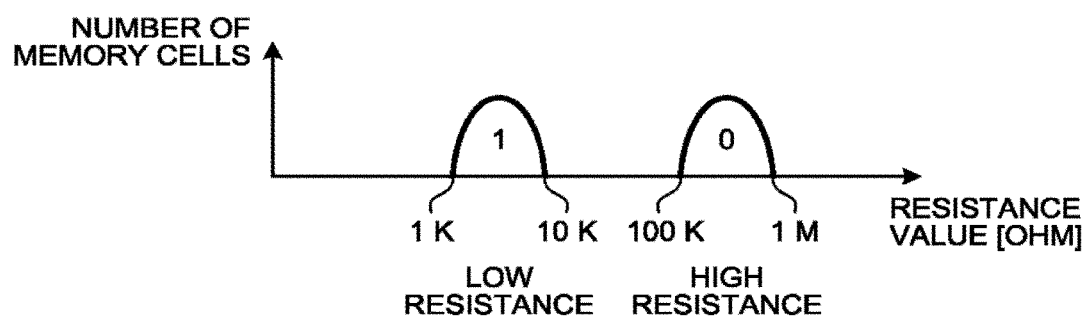
FIG. 4 is a diagram illustrating an electrical characteristic of a memory cell according to the first embodiment.

An electrical characteristic of a memory cell MC will be described with reference to FIG. 4. As described above, a memory cell MC can have a low resistance state or a high resistance state in accordance with a resistance value of the variable resistance element MR. When a memory cell MC is in the low resistance state, the memory cell MC is regarded as being in a state in which a data value "1" is held. When a memory cell MC is in the high resistance state, the memory cell MC is regarded as being in a state in which the data value "0" is held. The low resistance state indicates a case in which a resistance value is, for example, 1 k to 10 k ohm. Further, the high resistance state indicates a case in which the resistance value is, for example, 100 k to 1 M ohm.

Figure 5:
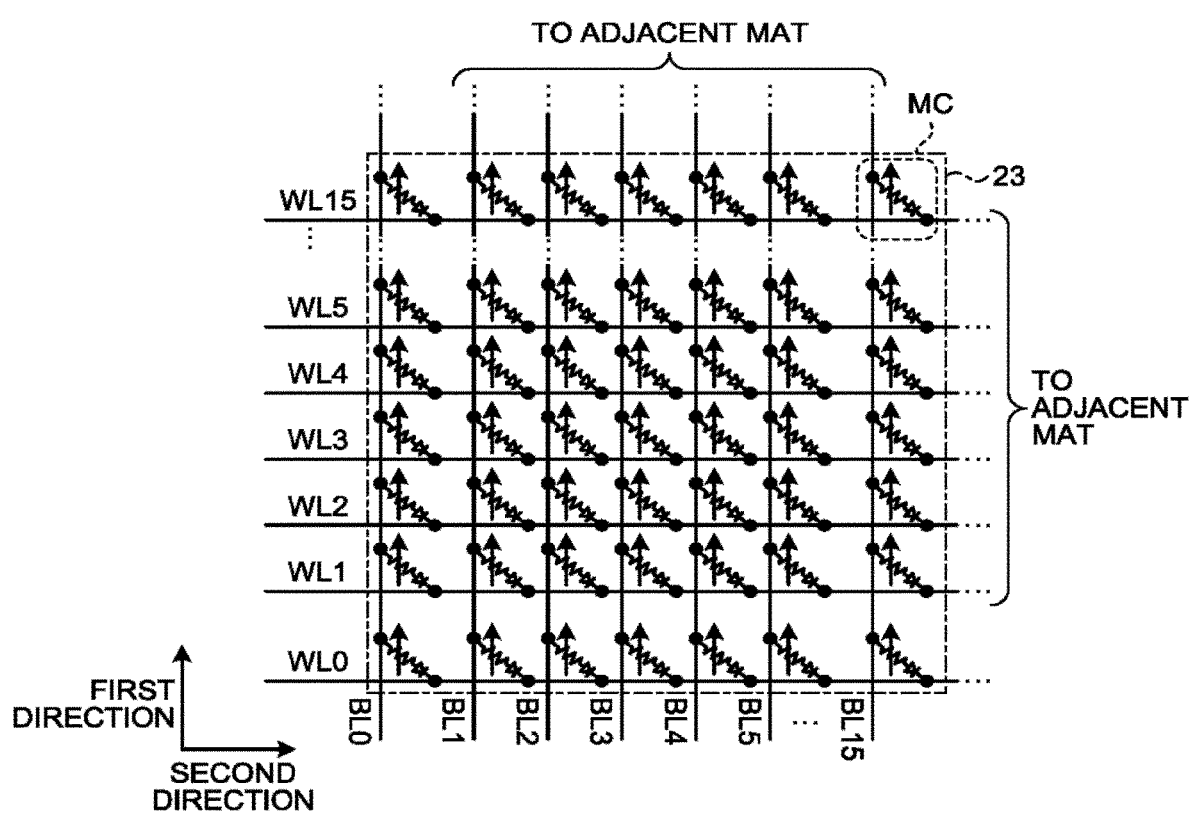
FIG. 5 is a circuit diagram of the memory cell array according to the first embodiment.

FIG. 5 is a circuit diagram of the memory cell array 22, and particularly illustrates an area corresponding to an area A1 of FIG. 2 in one memory cell layer. As illustrated in FIG. 5, a plurality of bit lines BL and a plurality of word lines WL are formed in the memory cell array 22 to pass through a plurality of mats 23

A mat 23 includes 16 bit lines BL and 16 word lines WL as described above. Further, (m+1)×(n+1) mats 23 are disposed as described above. In other words, word lines WL (16$i$) to WL (16$i$+15) are formed in a certain block BLKi. Further, bit lines BL (16$j$) to BL (16$j$+15) are formed in each of a plurality of mats 23 included in a certain block BLK. Here, i=0 to n, and j=0 to m.

A memory cell MC is formed at each of the crossing points of the bit lines BL and the word lines WL.

The access circuit 21 selects a word line WL and a bit line EL in accordance with a physical address supplied from the memory controller 10. Then, the access circuit 21 applies a corresponding voltage to each of the selected word line WL, non-selected word lines WL, the selected bit line EL, and non-selected bit lines BL to refer to or change a state of a memory cell MC located at a crossing point of the selected word line WL and the selected bit line BL.

The ReRAM 20 is an example of a first non-volatile memory according to an embodiment. Instead of the ReRAM 20, an arbitrary kind of semiconductor memory can be applied as the first non-volatile memory. For example, a magnetoresistive random access memory (MRAM) or a NAND type flash memory can be applied as the first non-volatile memory.

The description continues with reference back to FIG. 1. The memory controller 10 includes a processor 11 and a static random access memory (SRAM) 12.

The processor 11 is a processing device such as a central processing unit (CPU). The processor 11 implements various functions of the memory controller 10 in accordance with a program. The program is stored in, for example, the ReRAM 20 in advance. The processor 11 may load the program from the ReRAM 20 onto the SRAM 12 when the memory system 1 is started up. The processor 11 may execute the program loaded onto the SRAM 12.

For example, the processor 11 translates logical addresses included in access commands into physical addresses indicating locations in the ReRAM 20.

In a case where the memory controller 10 receives a write command, the processor 11 transmits, to the ReRAM 20, a writing instruction, data transmitted from the host 2, and a physical address obtained by the translation.

In a case where the memory controller 10 receives a read command, the processor 11 transmits, to the ReRAM 20, a reading instruction and a physical address obtained by the translation. When the memory controller 10 receives data from the ReRAM 20, the processor 11 transmits the received data to the host 2.

Further, the processor 11 executes the wear leveling. The wear leveling is a process of distributing access to the respective memory cells MC in the memory cell array 22 in order to prevent access from concentrating on a specific memory cell MC. Specifically, the processor 11 changes a correspondence (mapping) between logical addresses and physical addresses at a predetermined timing.

Figure 6A:
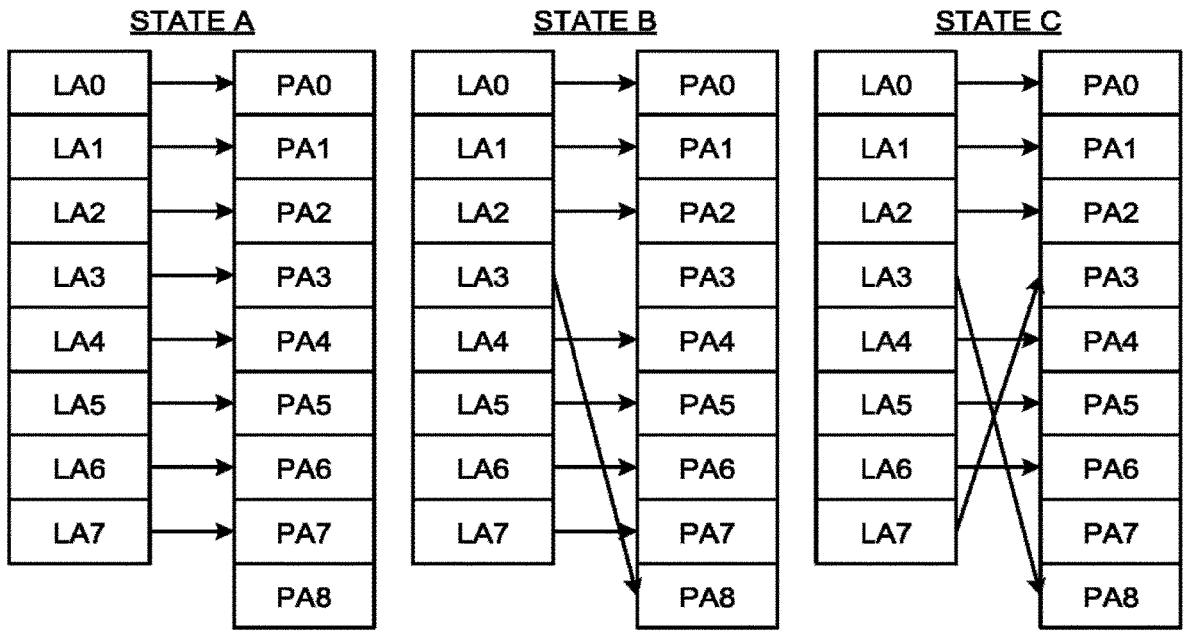
FIG. 6A is a diagram illustrating an example of transition of mapping according to wear leveling of the first embodiment.
Figure 6B:
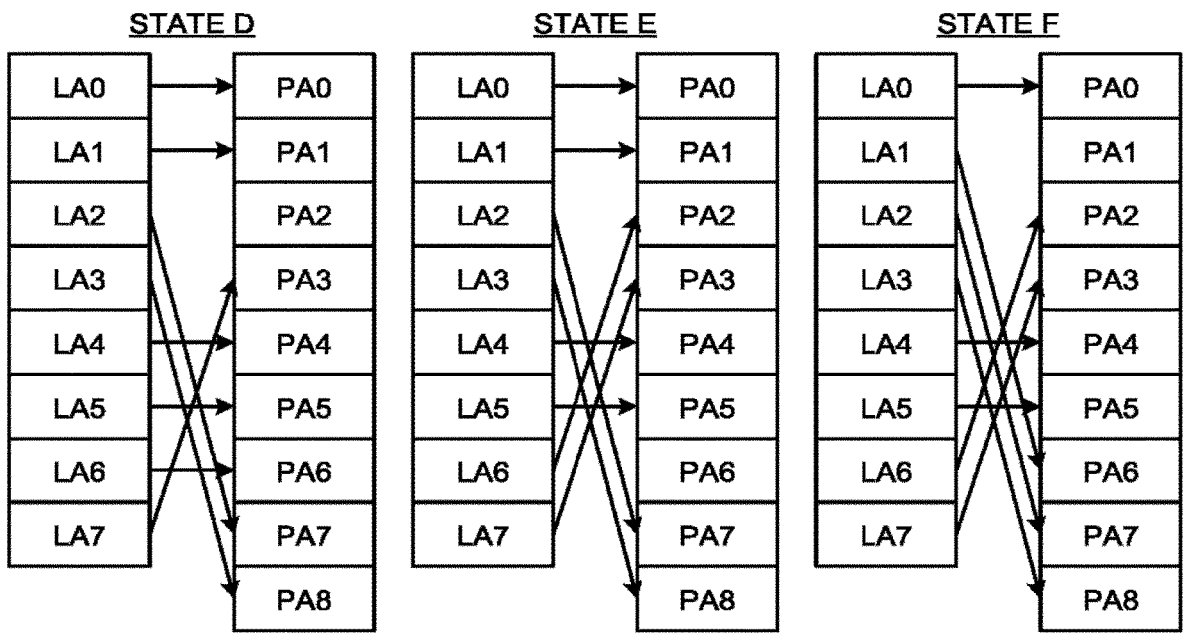
FIG. 6B is a diagram illustrating an example of transition of mapping according to wear leveling of the first embodiment.
Figure 6C:
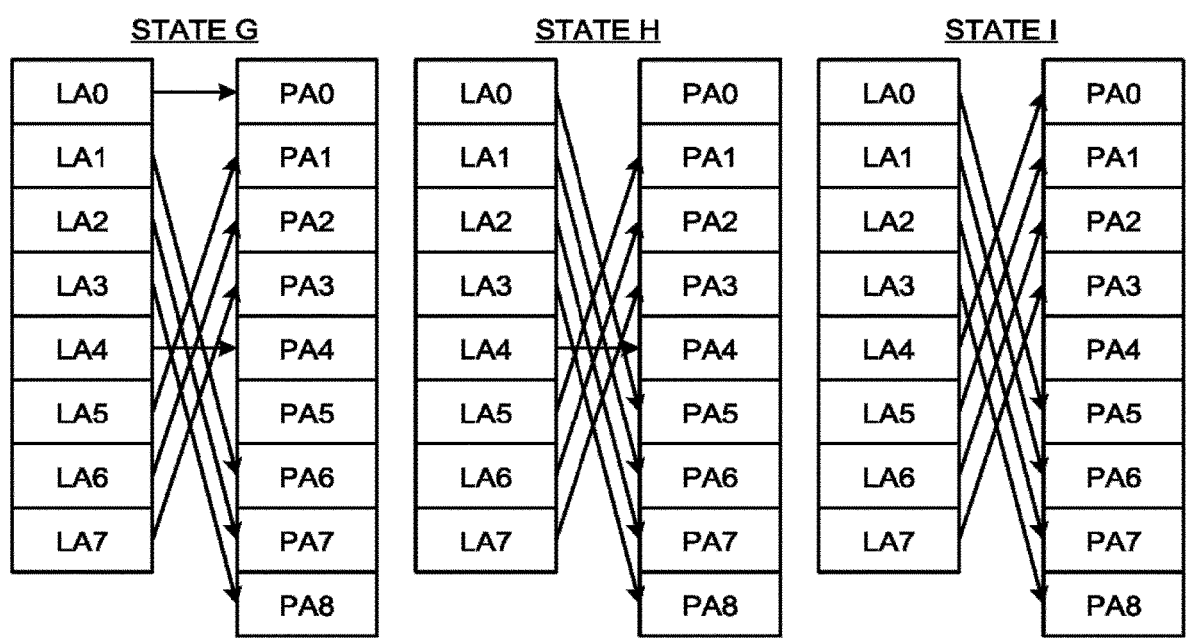
FIG. 6C is a diagram illustrating an example of transition of mapping according to wear leveling of the first embodiment.

FIGS. 6A to 6C are diagrams illustrating an example of transition of mapping according to the wear leveling of the first embodiment. According to the example illustrated in FIGS. 6A to 6C, eight consecutive logical addresses LA0 to LA7 in one logical area are associated with eight physical addresses among nine consecutive physical addresses PA0 to PA8 in one physical area. The logical area is a part or all of the logical address space. The physical area is a part or all of a storage area constituted by the memory cell array 22.

LA denotes a logical address, and a number appended after LA denotes an address value. PA denotes a physical address, and a number appended after PA indicates an address value. Here, as an example, both a first address value of the logical area and a first address value of the physical area are assumed to be zero.

Further, since a total number of logical addresses is 8, a total number of physical addresses is 9, and one physical address is in a state not associated with any logical address. A physical address that is not associated with any logical address is referred to as a "vacant physical address." Each arrow indicates a pair of a logical address and a physical address associated with the logical address. Since the logical addresses LA0 to LA7 include eight logical addresses, mapping in each state includes eight pairs.

In the state A, the physical address PA0 is associated with LA0 which is the head logical address of the logical area. The physical address associated with the head logical address LA0 is referred to as an "origin." In the mapping of the state A, the origin is the physical address PA0. In the state A, the logical address LAi (here, "i" is an integer from 0 to 7) which is a logical address offset from the head logical address LA0 by "i," is associated with a physical address PAi which is a physical address offset from the origin by "i." As described above, a state in which all consecutive logical addresses are linearly associated with a plurality of consecutive physical addresses is referred to as a "basic state."

In an embodiment, the physical area is regarded as a ring buffer in which the physical addresses are logically arranged in a ring form. In other words, the physical address PA0 which is the head of the physical area and the physical address PA8 which is the end of the physical area are treated as being adjacent to each other.

Therefore, if "i" corresponds to all integers from 0 to Nla−1, the state of the mapping of associating the logical address LAi with the physical address PA ((Org+i) % Npa) corresponds to the basic state. In one example, the state 1 illustrated in FIG. 6C corresponds to the basic state.

Here, Org indicates the origin. Nla indicates a total number of logical addresses in the logical area. Npa indicates a total number of the physical addresses in the physical area. In other words, in this example, Npa is 9. "%" indicates an operator for calculating a remainder. In other words, a % b indicates a remainder obtained by dividing "a" by "b."

Hereafter, in this specification, the physical address at the head of the physical area is logically adjacent to the physical address at the end of the physical area.

As illustrated in the state A and the state T, in the basic state, the physical address subsequent to the physical address associated with the logical address at the end of the logical area (in this case, the logical address LA7) corresponds to the vacant physical address. The vacant physical address is followed by the physical address of the origin.

In the first embodiment, by updating the mapping for each logical address, transition from the basic state (for example, the state A of FIG. 6A) to a next basic state (for example, the state I in FIG. 6C) whose origin Org differs from the previous basic state is performed. A shift amount of the origin Org preset as a distance Dst. Here, as an example, the origin Org is shifted in a direction in which the address value decreases (that is, a negative direction) by the distance Dst. For example, in the case of FIGS. 6A to 6C, the distance Dst is 4, and the origin Org is shifted to the physical address PA5 which is away from the physical address PA0 in the negative direction by 4.

While the mapping proceeds from the basic state to the next basic state, a plurality of pairs which are included in the mapping and each of which indicates a one-to-one correspondence between a logical address and a physical address are sequentially updated. Updating of each pair will be described later in detail. Hereafter, updating a pair associated with a certain logical address may be described as updating a logical address.

The SRAM 12 is a memory which can be used as a working area, a buffer, a cache, or the like by the processor 11.

Particularly, origin information 121, distance information 122, and count information 123 are stored in the PRAM 12. The origin information 121 is information indicating the origin Org. The distance information 122 is information indicating the distance Dst which is the shift amount of the origin Org. The count information 123 is information indicating a count value Cnt indicating the number of times of executed updatings of a pair. Here, the origin Org is recorded in the origin information 121, the distance Dst is recorded in the distance information 122, and the count value Cnt is recorded in the count information 123.

Figure 7:
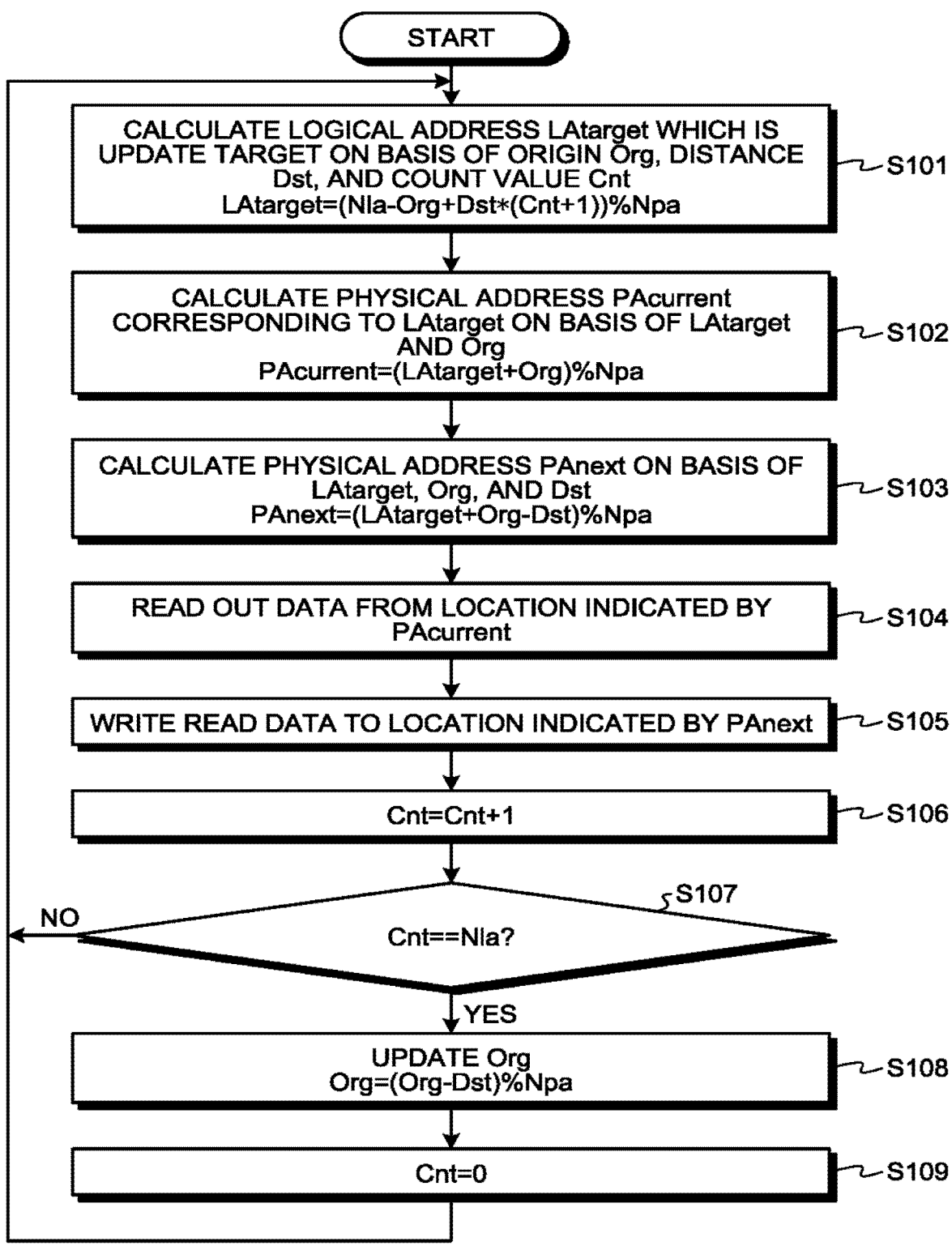
FIG. 7 is a flowchart illustrating a procedure of wear leveling of the first embodiment.

Next, an operation of the memory system 1 of the first embodiment will be described. FIG. 7 is a flowchart illustrating the procedure of the wear leveling according to the first embodiment. When the procedure illustrated in FIG. 7 starts, the mapping is assumed to be in the basic state, and the count value Cnt is assumed to be zero.

First, the processor 11 calculates, on the basis of the origin Org, the distance Dst, and the count value Cnt, a logical address LAtarget which is an update target 101). The processor 11 obtains the logical address LAtarget in accordance with the following Formula (1).

$$LAtarget = (Nla - Org + Dst*(Cnt+1)) \% Npa \quad (1)$$

As described above, Nla indicates a total number of logical addresses in the logical area, and Npa indicates a total number of physical addresses in the physical area. According to the example of FIGS. 6A to 6C, Nla is 8, and Npa is 9.

In S101, the processor 11 uses the origin Org recorded in the origin information 121 in the SRAM 12. The processor 11 uses the distance Dst recorded in the distance information 122 in the SRAM 12. The processor 11 uses the count value Cnt recorded in the count information 123 in the SRAM 12.

Then, the processor 11 calculates, on the basis of the logical address LAtarget and the origin Org, a physical address PAcurrent which is a current physical address corresponding to the logical address ZAtarget (S102). In the basic state, an offset amount from the head logical address is equal to an offset amount from the origin Org. Further, the physical area is regarded a ring buffer. Therefore, the processor 11 can obtain the physical address PAcurrent in accordance with the following Formula (2).

$$PAcurrent = (LAtarget + Org) \% Npa \quad (2)$$

Then, the processor 11 calculates a physical address PAnext on the basis of the logical address LAtarget, the origin Org, and the distance Dst (S103). The physical address PAnext is a physical address to which the logical address LAtarget is to be newly associated. The processor 11 calculates the physical address which is away from the physical address PAcurrent by the distance Dst in the negative direction as the physical address PAnext. Specifically, the processor 11 can obtain the physical address PAnext in accordance with the following Formula (3).

$$PAnext=(LAtarget+Org-Dst)\% \, Npa \qquad (3)$$

Then, the processor 11 reads out data stored at the location indicated by the physical address PAcurrent (S104) and writes the read data to the location indicated by the physical address PAnext (S105).

In the process of S109 and S105, the processor 11 moves data which is referred to by the logical address LAtarget from the host 2 from the physical address PAcurrent to the physical address PAnext. The processor 11 may use the SRAM 12 as a buffer for moving data.

Then, the processor 11 increments the count value Cnt (S106). The processor 11 adds 1 to the count value Cnt and updates the count information 123 with a value obtained by the addition.

Then, the processor 11 determines whether or not the count value Cnt (that is, the count value Cnt updated in S106) is equal to the total number Nla of logical addresses (S107). Each pair is updated once until the mapping have a next basic state after getting out of a basic state. Therefore, the process of S107 corresponds to a process of determining whether or not the mapping results in being in the basic state again.

When the count value Cnt is not equal to the total number Nla of logical addresses (S107, No), the process proceeds to S101, and updating of another pair is executed.

When the count value Cnt is equal to the total number Nla of logical addresses (S107, Yes), the processor 11 updates the origin Org in accordance with the following Formula (4) (S108). The processor 11 overwrites the origin information 121 with the value obtained by Formula (4).

$$Org-(Org-Dst)\% \, Npa \qquad (4)$$

Then, the processor 11 resets the count value Cnt to zero (S109). The processor 11 overwrites the count information 123 with zero.

It should be noted that, in S106 and S109, the processor 11 may update the count value Cnt using the following Formula (5).

$$Cnt=(Cnt+1)\% \, Nla \qquad (5)$$

When the execution of S109 is completed, the process proceeds to S101.

The process of S101 to S107 constitutes a loop process. A single updating is realized by a single execution of the loop process. By a single updating, a single pair is updated. An updating pf a pair is executed Nla times, so that the mapping is shifted from the basic state to the next basic state.

A relation between two consecutive updatings among Nlan updatings will be described. The logical address LAtarget, the physical address PAcurrent, and the physical address PAnext obtained in i-th updating are indicated by LAtarget_i, PAcurrent_i, and PAnext_i. First, for the logical address LAtarget, the following relation indicated in Formula (6) can be established.

$$LAtarget\_(i+1)-(LAtarget\_i+Dst)\% \, Npa \qquad (6)$$

Further, according to Formula (2), Formula (3), and Formula (6), the relation indicated in the following Formula (7) can be derived.

$$PAnext\_(i+1)-(LAtarget\_(i+1)+Org-Dst)\% \, Npa= \\ (LAtarget\_i+Org)\% \, Npa=PAcurrent\_i \qquad (7)$$

Formula (7) means that PAcurrent_i becomes the vacant physical address by an i-th updating and is then associated with LAtarget_(i+1) in an (i+1)-th updating. That is, a physical address PAnext_(i+1) which is newly associated with a logical address LAtarget_(i+1) is a physical address which is away from the physical address PAcurrent_(i+1) in the negative direction by the distance Dst in the physical area, and the physical address is identical to the physical address PAcurrent_i obtained in the i-th updating.

Furthermore, according to Formula (6), the logical address which is away from the logical address LAtarget_i in the i-th updating by a value corresponding to the distance Dst is selected as a logical address LAtarget_(i+1) in the (i+1)-th updating. More specifically, according to Formula (6), in the (i+1)-th updating, the logical address LAtarget_(i+1) is calculated by a remainder calculation in which a value obtained by adding the distance Dst to the logical address LAtarget_i in the i-th updating is used as a dividend, and the total number Npa of physical addresses is used as a divisor. Therefore, the processor 11 calculates the logical address LAtarget_(i+1) so that the physical address away from the physical address PAcurrent_i in the positive direction by the distance Dst can be obtained as the physical address PAcurrent_(i+1) by Formula (2).

As described above, according to the procedure illustrated in FIG. 7, the logical address LAtarget is selected so that the physical address PAcurrent is shifted in the positive direction by the distance Dst in the physical area each time an updating is performed. In each updating, the logical address LAtarget is associated with the physical address PAnext which is away from the physical address PAcurrent in the negative direction in the physical area. Accordingly, in each updating, it is possible to associate the physical address which became a vacant physical address by the previous updating with the logical address LAtarget.

Next, specific examples of respective updatings will be described with reference to FIGS. 6A to 6C. As described above, in the example illustrated in FIGS. 6A to 6C, 4 is set as the distance Dst.

In the state A, the count value Crit is zero, and the origin Org is PA0 (that is, zero). Therefore, the logical address LA3 is obtained as the logical address LAtarget_0 of the update target on the basis of Formula (1). Further, the physical address PA3 is obtained as the physical address PAcurrent_0 corresponding to the logical address LAtarget_0 on the basis of Formula (2). Further, the physical address PA8 which is a physical address which is away from the physical address PA3 in the negative direction by 4 is obtained as the physical address PAnext_0 on the basis of Formula (3). The physical address PA8 is associated with the logical address LA3, and as a result, the mapping transitions to the state B.

In the state B, the logical address LA7 is obtained as the logical address LAtarget_1. The logical address LA7 is a logical address corresponding to the physical address PA7 which is a physical address away from the physical address PA3 which is the physical address PAcurrent_0 in the positive direction by 4 and serves as the physical address PAcurrent_1. The physical address PA3 which is a physical address away from the physical address PA7 in the negative direction by 4 is obtained as the physical address PAnext_1.

The physical address PA3 is associated with the logical address LA7, and as a result, the mapping transitions to the state C.

In the state C, the logical address LA2 is obtained as the logical address LAtarget_2. The logical address LA2 is a logical address corresponding to the physical address PA2 which is a physical address away from the physical address PA7 which is the physical address PAcurrent_1 in the positive direction by 4 and serves as the physical address PAcurrent_2. Further, the physical address PA7 which is a physical address away from the physical address PA2 in the negative direction by 4 is obtained as the physical address PAnext_2. The physical address PA7 is associated with the logical address LA2, and as a result, the mapping transitions to the state D.

In the state D, the logical address LAP is obtained as the logical address LAtarget_3. The logical address LA6 is a logical address corresponding to the physical address PA6 which is a physical address away from the physical address PA2 which is the physical address PAcurrent_2 in the positive direction by 4 and serves as the physical address PAcurrent_3. Further, the physical address PA2 which is a physical address away from the physical address PA6 in the negative direction by 4 is obtained as the physical address PAnext_3. The physical address PA2 is associated with the logical address LA6, and as a result, the mapping transitions to the state E.

Hereafter, through similar procedures, the physical address PAG is associated with the logical address LA1 in the state E, the physical address PA1 is associated with the logical address LA5 in the state F, the physical address PA5 is associated with the logical address LA0 in the state G, and the physical address PA0 is associated with the logical address LA4 in the state H. As a result of the updatings, the mapping returns to the basic state as indicated in the state Next, a procedure for translating a logical address into a physical address will be described. For example, when the memory system 1 receives an access command from the host 2, the processor 11 translates a logical address included in the access command into a physical address and accesses the location indicated by the obtained physical address. The logical address designated as the access location is referred to as a "logical address LAaccess." Further, the physical address corresponding to the logical address LAaccess is referred to as a "physical address PAaccess."

Figure 8:
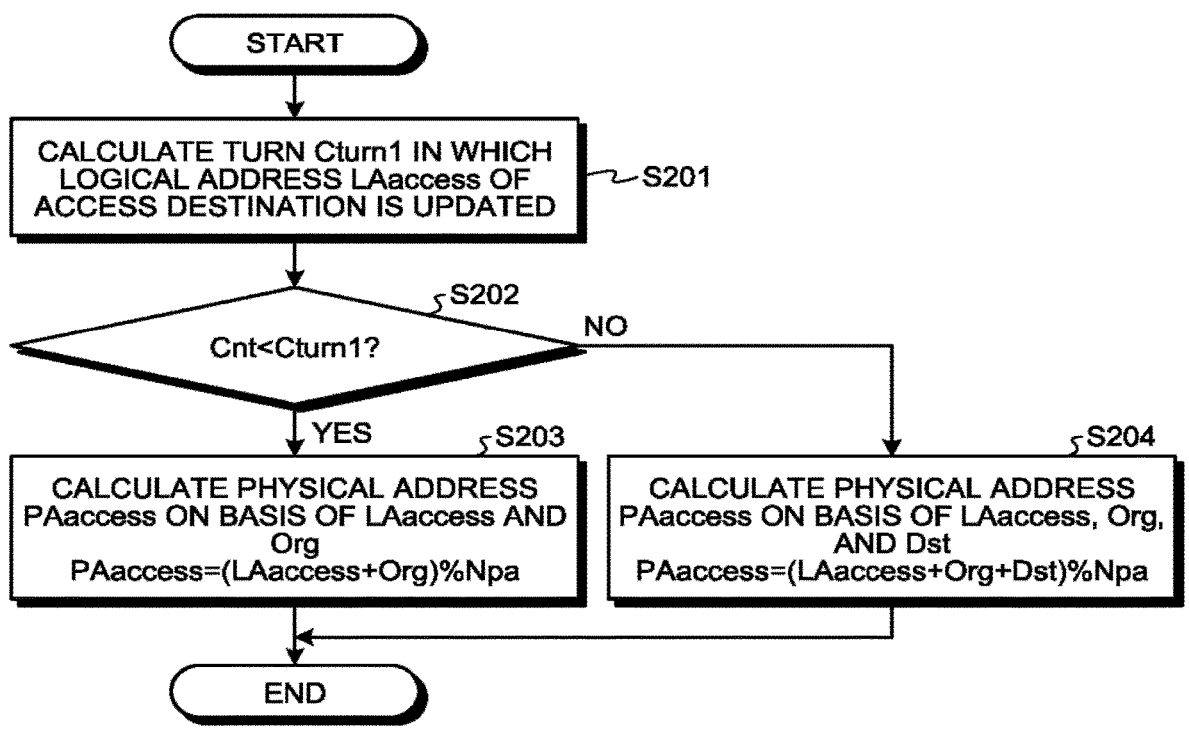
FIG. 8 is a flowchart illustrating a procedure of translating a logical address to a physical address according to a first embodiment.

FIG. 8 is a flowchart illustrating a procedure of translating the logical address LAaccess into the physical address PAaccess according to the first embodiment.

First, the processor 11 calculates a turn Cturn1 in which a pair associated with the logical address LAaccess is updated (S201). The turn Cturn1 is the count value Cnt in which a pair associated with the logical address LAaccess is updated. In other words, the turn Cturn1 indicates the number of times of updatings executed on the mapping which is required until a pair associated with the logical address LAaccess is updated after the mapping is in the basic state lastly. A method of calculating the turn Cturn1 will be described later.

Then, the processor 11 determines whether or not the count value Cnt is smaller than the turn Cturn1 (S202). The processor 11 reads the count value Cnt from the count information 123 stored in the SRAM 12.

When the count value Cnt is smaller than the turn Cturn1, it has to be said that the logical address LAaccess is not updated yet. When the count value Cnt is the turn Cturn1 or more, it has to be said that the logical address LAaccess is already updated.

Therefore, when the count value Cnt is smaller than the turn Cturn1 (S202, Yes), the processor 11 calculates the physical address PAaccess on the basis of the logical address LAaccess and the origin Org (S203). Specifically, the processor 11 calculates the physical address PAaccess on the basis of the following Formula (8).

$$PAaccess = (LAaccess + Org) \% Npa \qquad (8)$$

When the count value Cnt is not smaller than the turn Cturn1 (S202, No), the processor 11 calculates the physical address PAaccess on the basis of the logical address LAaccess, the origin Org, and the distance Dst (S204). Specifically, the processor 11 calculates the physical address PAaccess on the basis of the following Formula (9).

$$PAaccess = (LAaccess + Org + Dst) \% Npa \qquad (9)$$

In S203 and S204, the processor 11 uses the origin Org recorded in the origin information 121 in the SRAM 12. Further, in S204, the processor 11 uses the distance Dst recorded in the distance information 122 in the SRAM 12.

After S203 or S204, the process of translating the logical address LAaccess into the physical address PAaccess is completed.

As described above, the processor 11 decides whether e physical address is obtained using the origin Org or the physical address is obtained using the origin Org and the distance Dst by comparing the count value Cnt which is sequentially updated each time a pair is updated with the turn Cturn1 in which the pair associated with the logical address LAaccess is updated.

Next, the procedure of calculating the turn Cturn1 in which the logical address LAaccess is updated (that is, the process of S201) will be described.

As suggested by Formula (6), the logical address LAtarget is shifted in the positive direction by the distance Dst each time an updating is performed until number of times of executing the updating reaches the total number Npa of physical addresses. Therefore, a plurality of logical addresses whose remainders obtained by dividing by the distance Dst are identical are consecutively selected as the logical address LAtarget. Among a plurality of logical addresses whose remainders are identical, each of the logical addresses is selected as the logical address LAtarget in the order according to a quotient obtained by dividing the logical address by the distance Dst. If a value of a logical address which is to be selected as next logical address LAtarget becomes equal to or more than the total number Npa of physical addresses, a logical address whose remainder obtained by dividing by the distance Dst is different from that of the logical address previously selected as the logical address LAtarget.

As described above, according to the procedure illustrated in FIG. 7, each logical address LAtarget tends to be selected in order on the basis f the remainder and the quotient obtained by dividing each logical address by the distance Dst. In the first embodiment, the turn Cturn1 is calculated by using such a tendency.

Figure 9:
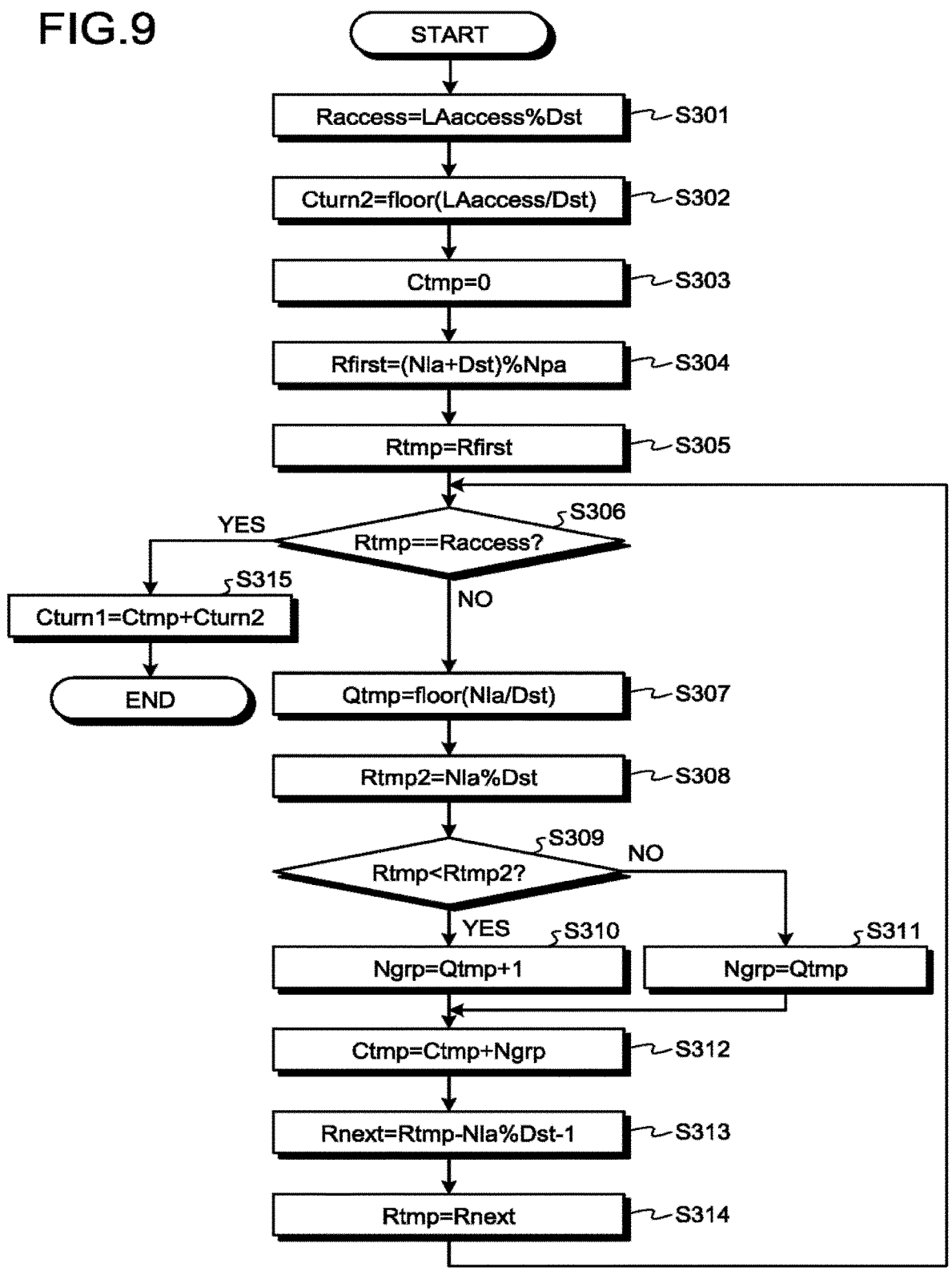
FIG. 9 is a flowchart illustrating a procedure of calculating a turn in which a logical address is updated according to the first embodiment.

FIG. 9 is a flowchart illustrating an example of the procedure of calculating the turn Cturn1 in which the logical address LAaccess is updated according to the first embodiment. In description of FIG. 9, a remainder refers to the remainder obtained by dividing a logical address by the distance Dst unless otherwise set forth herein.

First, the processor 11 obtains a remainder Raccess of the logical address LAaccess (S301). This process can be expressed as Formula (10) below.

$$Raccess = LAaccess \% Dst \qquad (10)$$

Subsequently to S301, the processor 11 calculates the turn Cturn2 in which the logical address LAaccess is updated among all the logical addresses whose remainders are equal to the remainder Raccess (S302). For the processor 11, for example, Cturn2 can be obtained by the following Formula (11). Here, floor(a/b) is a function for obtaining a quotient by dividing "a" by "b."

$$Cturn2=\text{floor}(LAaccess/Dst) \quad (11)$$

Subsequently to S302, the processor 11 resets a variable Ctmp of the count value to zero (S303). Then, the processor 11 calculates a remainder Rfirst of a logical address to be updated first (S304). The processor 11 can obtain the remainder Rfirst on the basis of the following Formula (12).

$$Rfirst=(Nla+Dst)\% Npa \quad (12)$$

Subsequently to S304, the processor 11 assigns the remainder Rfirst to a variable Rtmp (S305). Then, the processor 11 determines whether or not the remainder Rtmp is equal to the remainder Raccess (S306).

When the remainder Rtmp is not equal to the remainder Raccess (S306, No), in S307 to S311, the processor 11 calculates the number Ngrp of logical addresses whose remainders are equal to the remainder Rtmp.

Specifically, first, the processor 11 calculates a quotient Qtmp obtained by dividing the total number Nla of logical addresses by the distance Dst (S307). In other words, the processor 11 calculates the quotient Qtmp on the basis of the following Formula (13).

$$Qtmp=\text{floor}(Nla/Dst) \quad (13)$$

Then, the processor 11 calculates a remainder Rtmp2 obtained by dividing the total number Nla of logical addresses by the distance Dst (S308). In other words, the processor 11 calculates the remainder Rtmp2 on the basis of the following Formula (14).

$$Rtmp2=Nla \% Dst \quad (14)$$

Then, the processor 11 determines whether or not the remainder Rtrnp is smaller than the remainder Rtmp2 (S309). When the remainder Rtrnp is smaller than the remainder Rtmp2 (S309, Yes), the processor 11 assigns, to Ngrp, a value obtained by adding 1 to Qtmp (S310). When the remainder Rtmp is not smaller than the remainder Rtmp2 (S309, No), the processor 11 assigns Qtmp to Ngrp (S311).

Subsequently to S310 or S311, the processor 11 adds Ngrp to Ctmp and assigns the value obtained by the addition to Ctmp (S312).

Then, the processor 11 calculates a remainder Rnext (S313). The remainder Rnext is a remainder obtained by dividing the logical address set as the next logical address LAtarget by the distance Dst. Specifically, the processor 11 can obtain the remainder Rnext on the basis of the following Formula (15).

$$Rnext=Rtmp-Nla \% Dst-1 \quad (15)$$

Then, the processor 11 assigns the remainder Rnext to Rtmp (S314), and the process proceeds to S306.

When it is determined in S306 that Rtmp is equal to the remainder Raccess (S306, Yes), the processor 11 adds Cturn2 to Ctmp and assigns the value obtained by the addition to Cturn1 (S315). Then, the procedure of calculating the turn Cturn1 is completed.

As described above, the processor 11 can obtain, on the basis of the logical address LAtarget and the distance Dst, the turn Cturn1 in which the logical address LAaccess is updated. The processor 11 can obtain the turn Cturn1 by accumulating the number of logical addresses set as the logical address LAtarget for each group having an identical value as the remainder.

In the above description, both the head address value of the logical area and the head address value of the physical area are assumed to be zero. The head address value of the logical area or the head address value of the physical area may not be zero. When the head address value of the logical area is not zero, the above algorithm can be applied by replacing each logical address in the logical area with an offset amount from the head address. Similarly, when the head address value of the physical area is not zero, the above algorithm can be applied by replacing each physical address in the physical area with an offset amount from the head address.

In the above description, the number of vacant physical addresses is assumed to be 1. The number of vacant physical addresses may be two or more. For example, the n consecutive physical addresses (n>1) are set as the vacant physical address. In each updating, each of the n consecutive logical addresses is selected as the logical address LAtarget, and each of the n vacant physical addresses is selected as the physical address PAnext. In each updating, a plurality of logical addresses LAaccess and a plurality of the physical addresses PAnext are associated to correspond linearly.

Further, in the above description, the origin Org can be shifted in the negative direction by the distance Dst. The origin Org may be shifted in the positive direction by the distance Dst by modifying the algorithm described above.

In the above description, the processor 11 executes an updating of the mapping. A part or all of the process performed by the processor 11 may be executed by a hardware circuit.

Further, the SRAM 12 is an example of a second memory in which the distance information 122, the origin information 121, and the count information 123 are stored. Some or all of the distance information 122, the origin information 121, and the count information 123 may be stored in a memory different from the SRAM 12. Some or all of the distance information 122, the origin information 121, and the count information 123 may be stored in the ReRAM 20. Some or all of the distance information 122, the origin information 121, and the count information 123 may be held in a register or the like in the processor 11.

As described above, according to the first embodiment, the memory controller 10 associates the physical addresses with each of the plurality of consecutive logical addresses. The total number of physical addresses is at least one more than the total number of the logical addresses. In a first updating, the memory controller 10 associates the physical address PAnext_0 with the logical address LAtarget_0 which is one of a plurality of logical addresses. Then, in a second updating, the memory controller 10 obtains, on the basis of the origin Org and the distance Dst, the logical address LAtarget_1 which is away from the logical address LAtarget_0 by a value corresponding to the distance Dst, and associates the physical address PAnext_1, that is, the physical address PAcurrent_0 with the logical address LAtarget_1. The physical address PAcurrent_0 is the physical address which had been associated with the Logical address LAtarget_0 before the first updating.

With this configuration, the mapping can be shifted by the distance Dst.

When accesses are concentrated on one logical address, an access frequency to a logical addresses adjacent to the one logical address also tends to become higher. Here, as an example, a case in which accesses are concentrated on a range of the logical addresses LA4 to LA6, and a range of the physical addresses PA4 to PA6 is linearly associated with a range of the logical addresses LA4 to LA6 is considered. In this case, if the shift amount of the origin, that is, the distance Dst is 1, a range of the physical addresses PA3 to PA5 is newly associated with the range of the logical addresses LA4 to LA6 through an updating. Since the physical address PA4 and the physical address PA5 correspond to the range of the logical addresses on which accesses are concentrated even after the updating, exhaustion of the locations of the physical address PA4 and the physical address PA5 is accelerated. On the other hand, if, for example, 3 is set as the distance Dst, the range of the physical addresses PA1 to PA3 is newly associated with the range of the logical addresses LA4 to LA6 through an updating. In other words, the range of physical addresses corresponding to the range of logical addresses on which access are concentrated does not overlap before and after the updating. Therefore, acceleration of exhaustion of a specific location in the physical area is prevented.

As described above, it is possible to disperse accesses to the physical area, for example, by setting a setting value of the distance Dst to be larger than a width of a range on which accesses are concentrated. Therefore, it is possible to efficiently change a correspondence between logical addresses and physical addresses.

Further, according to the above configuration, since it is possible to shift the mapping if there is one vacant physical address, it is possible to save the size of the physical area. In other words, it is possible to efficiently change the correspondence between logical addresses and physical addresses.

Further, according to the first embodiment, the memory controller 10, in the i-th updating, obtains the logical address LAtarget_i on the basis of the origin Org and the distance Dst, and associates the physical address PAnext_i with the logical address PAtarget_i. The physical address PAnext_i is identical to the physical address PAcurrent_(i−1) which had been associated with the logical address LAtarget_(i−1) before an (i−1)-th updating.

With this configuration, in each updating, it is possible to associate the physical address that had become the vacant physical address by the previous updating with the logical address LAtarget. By repeatedly executing an updating, it is possible to shift the physical addresses corresponding to all the logical addresses by the distance Dst.

Further, according to the first embodiment, the memory controller 10 holds the number of times of updatings which had been performed as the count value Cnt. The memory controller 10 calculates, on the basis of the logical address LAaccess and the distance Dst, the turn Cturn1 which is the number of times of updatings required until the logical address LAaccess indicating the access destination is updated. When the turn Cturn1 is larger than the count value Cnt, the memory controller 10 obtains the physical address PAaccess on the basis of the logical address LAaccess and the origin Org. When the turn Cturn1 is smaller than the count value Cnt, the memory controller 10 obtains the physical address PAaccess on the basis of the logical address LAaccess, the origin Org, and the distance Dst.

With this configuration, the memory controller 10 can translate the logical address LAaccess of an access target into the physical address PAaccess even before the mapping becomes in the next basic state.

The processing when the turn Cturn1 is equal to the count value Cnt may be decided in accordance with a relation between a data migration timing and a timing at which the physical address PAnext_i is associated with the logical address LAtarget_i. In a case in which the count value Cnt is updated after completing the data migration as in the procedure illustrated in FIG. 7, the memory controller 10 obtains the physical address PAaccess on the basis of the logical address LAaccess, the origin Org, and the distance Dst when the turn Cturn1 is equal to the count value Cnt.

According to the first embodiment, as indicated in Formula (1), the memory controller 10 performs, on the total number Nla of logical addresses, subtraction of the origin Org and addition of the distance Dst for each execution of an updating. Then, the memory controller 10 obtains, as the logical address LAtarget_i, the remainder obtained by dividing, by the total number Npa of physical addresses, the value obtained by the addition and the subtraction on the total number Nla of logical addresses. Further, as illustrated in FIG. 9, the memory controller 10 obtains the quotient (Cturn2) and the remainder (Raccess) obtained by dividing the logical address LAaccess of the access destination by the distance Dst and calculates the turn Cturn1 on the basis of the obtained quotient and the remainder.

According to the first embodiment, when all the logical addresses in the logical area are updated, the memory controller 10 updates the origin Org recorded in the origin information 121.

With this configuration, the memory controller 10 can continue executing updating the mapping after the mapping becomes in the basic state.

In the above description, the memory controller 10 continues executing updating the mapping after the mapping becomes in the basic state. The memory controller 10 may stop the wear leveling after the mapping becomes in the basic state. The memory controller 10 may stop the wear leveling before the mapping becomes in the basic state.

Second Embodiment

In the first embodiment, Ngrp is calculated on the basis of a comparison of the remainder Rtmp and the remainder Rtmp2 obtained by dividing the total number Nla of logical addresses by the distance Dst (S307 to S311).

In the second embodiment, an aliquot of the total number Nla of logical addresses is set as the distance Dst. By setting the distance Dst as described above, the remainder Rtmp2 obtained by dividing the total number Nla of logical addresses by the distance Dst becomes zero. Since it is clear that Rtmp is equal to or greater than Rtmp2, the processor 11 can set the quotient obtained by dividing the total number Nla of logical addresses by the distance Dst as Ngrp. In other words, it is possible to omit the process of obtaining the remainder Rtmp and the remainder Rtmp2 obtained by dividing the total number Nla of logical addresses by the distance Dst (S308) and the process of comparing Rtmp with Rtmp2 (S309).

In the first embodiment, the processor 11 calculates Rnext using the remainder obtained by dividing the total number Nla of logical addresses by the distance Dst in S313. According to the second embodiment, since the remainder obtained by dividing the total number Nla of logical addresses by the distance Dat is zero, the process of S313 becomes to be simpler than that of the first embodiment.

As described above, in the second embodiment, an aliquot of the total number Nla of logical addresses is set as the distance Dst. With this configuration, the process of translating the logical address LAaccess into the physical address PAaccess becomes simpler.

Third Embodiment

According to the second embodiment, an aliquot of the total number Nla of logical addresses is set as the distance Dst. In a third embodiment, each of the total number Nla of logical addresses and the distance Dst is configured with a power of 2. Accordingly, it is possible to implement the procedure of calculating the turn Cturn1 in which the logical address LAaccess is updated through simple bit operations.

Figure 10:
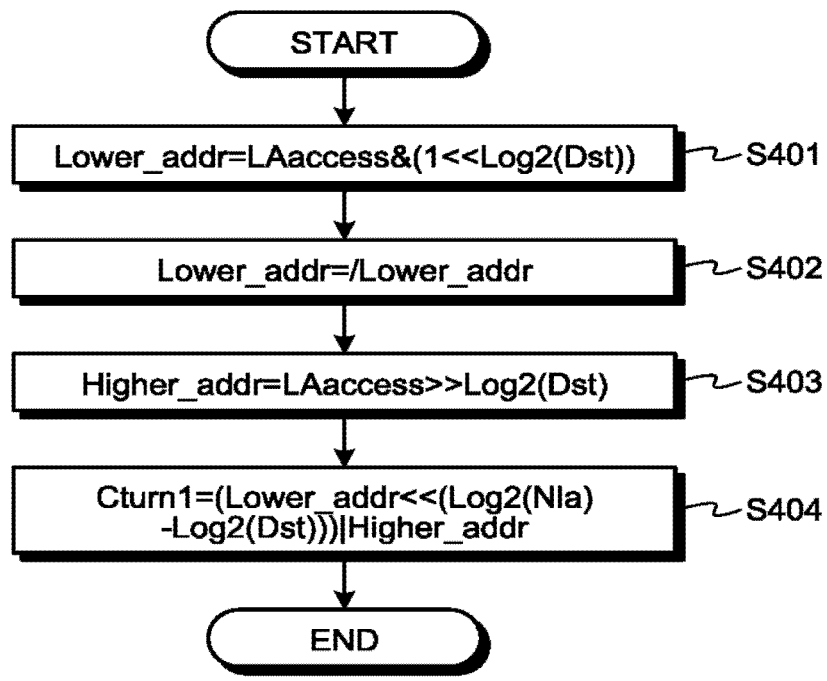
FIG. 10 is a flowchart illustrating a procedure of calculating a turn in which a logical address is updated according to a third embodiment.

FIG. 10 is a flowchart illustrating a procedure of calculating the turn Cturn1 in which the logical address LAaccess is updated according to the third embodiment. First, the processor 11 obtains Lower_addr 1 using the following Formula (16) (S401). Here, "&" is an operator indicating a bit- and operation. "<<" is an operator indicating a shift operation in the left direction.

$$\text{Lower\_addr} = LA\text{access} \& (1 << \text{Log}(Dst)) \quad (16)$$

Formula (16) is a process of acquiring a value of lowest two bits of LAaccess. Lower_addr obtained by this process corresponds to Raccess of the first embodiment.

Then, the processor 11 performs bit inversion on Lower_addr on the basis of the following Formula (17) (S402). "/" included in Formula (1) is an operator indicating a bit inversion.

$$\text{Lower\_addr} = \text{Lower\_addr} \quad (17)$$

Then, the processor 11 obtains Higher_addr on the basis of the following Formula (18) (S403). Here, ">>" is an operator indicating a shift operation in the right direction.

$$\text{Higher\_addr} = LA\text{access} >> \text{Log } 2(Dst) \quad (18)$$

Formula (18) is a process of cutting off the lowest two bits of LAaccess. Higher_addr obtained by this process corresponds to Cturn2 of the first embodiment.

Then, the processor 11 obtains the turn Cturn1 on the basis of the following Formula (19) (S404). Here, "|" is an operator indicating a bit-OR-operation.

$$\text{Cturn1} = (\text{Lower\_addr} << (\text{Log } 2(Nla) - \text{Log } 2(Dst))) | \text{Higher\_addr} \quad (10)$$

Formula (19) indicates a process of integrating the number of times of updatings for each value of the remainder and further adding Cturn2 to a value obtained by the integrating. After S404, the procedure of calculating the turn Cturn1 of the third embodiment is completed.

As described above, since each of the total number Nla of logical addresses and the distance Dst is configured with a power of 2, the turn Cturn1 can be obtained by the simple bit operations.

Fourth Embodiment

According to the first to third embodiments, data is migrated in each updating (S104 and S105). If it is known that the physical address PAcurrent is associated with an invalid logical address, the processor 11 may sip S104 and S105.

For example, the memory system 1 can receive, from the host 2, a command for designating a logical address and invalidating the designated logical address. Upon receiving the command, the processor 11 stores the designated logical address as an invalid logical address. Then, the processor 11 determines whether or not the logical address LAtarget corresponds to an invalid logical address before S104. When the logical address LAtarget is an invalid logical address, S104 and S105 are skipped.

The processor 11 may store information indication an invalid logical address using an arbitrary method. In one example, the processor 11 creates a list of invalid logical addresses and stores the list in the SRAM 12. The processor 11 updates the list each time a notification indicating the invalid logical address is given from the host 2 in accordance with a command. Instead of the list, the processor 11 may store the invalid logical addresses with any structure of information such as a table or flags. The processor 11 may store only the valid logical addresses and identify the invalid logical addresses The process 11 responds to the host 2 in accordance with a predetermined rule when there is a read command from the host 2 using the invalid logical address as an access destination. For example, the processor 11 gives a notification indicating the invalid logical address to the host 2.

As described above, according to the fourth embodiment, the memory controller 10 determines whether or not the logical address LAtarget is an invalid logical address. When the logical address LAtarget is not an invalid logical address, the memory controller 10 migrates the data stored in the physical address PAcurrent to the physical address PAnext. When the logical address LAtarget is an invalid logical address, the memory controller 10 skips the data migration.

With this configuration, the memory controller 10 can skip unnecessary data migration.

Further, the fourth embodiment can be applied to the memory systems I of the first to third embodiments.

Fifth Embodiment

The distance Dst may be configured to be varied. The processor 11 can change the distance Dst when completing updatings of all pairs. Specifically, the case in which updatings of all pairs is completed corresponds to a period from a timing at which value Cnt is determined be equal to the total number Nla of logical addresses to timing at which the process of S101 is executed next.

In one example, the memory system 1 receives a command of designating the distance Dst from the host 2. Upon receiving the command, the processor 11 overwrites content of the distance information 122 with the designated distance Dst in the above-described period.

In another example, the memory system 1 stores a sequence of candidate values of the distance Dst, for example, in the SRAM 12 in advance. The processor 11 updates the distance Dst with the candidate values described in the sequence each time the above-described period comes.

The sequence of candidate values of the distance Dst can be arbitrarily configured. For example, when the total number Nla of logical addresses is 16, a sequence such as "8, 4, 8, 2, 8, 4, 8, 1, 8, 4, 8, 2, 8, 4, 8, . . . " is stored in the SRAM 12 in advance. The processor 11 sets elements of the sequence as the distance Dst in order from the beginning of the sequence. This sequence is referred to as a first sequence.

The first sequence includes 8 which is half of the total number Nla of logical addresses, 4 which is a half value of 8, 2 which is a half value of 4, and 1 which is a value for shifting the mapping by 1. Therefore, the processor 11 can associate various physical addresses with the respective logical addresses in the logical area. Further, the first sequence includes many 8 which is half of the total number Nla of logical addresses as a reference. Accordingly, the mapping is shifted by half of the total number Nla of logical addresses. Therefore, even when the accesses are concentrated on a specific range of logical addresses, it is possible to efficiently distribute accesses to the physical area.

The above first sequence is an example. The sequence "8, 4, 8, 2, 8, 4, 8, 9, 8, 4, 8, 2, 8, 4, 8, . . . " or the sequence "8, 4, 8, 10, 8, 4, 8, 9, 8, 4, 8, 10, 8, 4, 8, . . . " can also be applied. The sequences are obtained by adding a half cycle (that is, 8) to a small value (for example, 1 or 2) among the elements included in the first sequence. As described above, the sequence of the candidate values of the distance Dst may be configured so that the shift amount is a certain value or more.

The fifth embodiment can be applied to the memory systems 1 of the first to fourth embodiments.

Sixth Embodiment

In the first to fifth embodiments, each time the mapping becomes in the basic state, the processor 11 resets the count value Cnt recorded in the count information 123 to zero and updates the origin Org recorded in the origin information 121. The origin information 121 may not be updated each time the mapping becomes in the basic state. Further, the count information 123 may not be reset to zero each time the mapping becomes in the basic state.

For example, the processor 11 records the count value Cnt' in the count information 123 instead of the count value Cnt. The count value Cnt' is a value indicating the number of times of updatings performed after the wear leveling starts. When the wear leveling starts for the first time, the processor 11 resets the count value Cnt' to zero, and then increments the count value Cnt' for each updating. The processor 11 does not reset the count value Cnt' even when the mapping becomes in the basic state. Further, the processor 11 records an origin Org_init which is the origin Org when the count value Cnt' is zero (that is, when the wear leveling starts for the first time) in the origin information 121.

In this case, the processor 11 can obtain the count value Cnt in accordance with the following Formula (20).

$$Cnt = Cnt' \% Nla \quad (20)$$

Further, the processor 11 can obtain the origin Org in accordance with the following Formula (21).

$$Org = (Org\_init - (Dst * \text{floor}(Cnt'/Nla)))\% Npa \quad (21)$$

Formula (21) is under the assumption that the distance Dst is a fixed value. A part of floor(Cnt'/Nla) indicates the number of times that the mapping becomes in the basic state since the wear leveling starts, and a part of (Dst*floor(Cnt'/Nla)) indicates a sum of the shift amounts of the origin Org after the wear leveling starts. When the distance Dst is configured to be varied, it is possible to calculate the origin Org from the origin Org_init by modifying the part of (Dst*floor(Cnt'/Nla)).

As described above, the algorithms described in the first to fifth embodiments can be variously modified.

Seventh Embodiment

The algorithms constituting the first to sixth embodiments include remainder operations. The processor 11 can substitute any remainder operation with other operation methods.

For example, in S101, the processor 11 may calculate LAtarget_i using a comparison operation instead of the remainder calculation. Specifically, for example, the processor 11 adds the distance Dst to the previous logical address LAtarget_(i−1). Then, the processor 11 compares (LAtarget_(i−1)+Dst) with Npa. When (LAtarget_(i−1)+Dst) is smaller than Npa, the processor 11 acquires (LAtarget_(i−1)+Dst) as LAtarget_i. When (LAtarget_(i−1)+Dst) is equal to or larger than Npa, the processor 11 acquires (LAtarget_(i−1)+Dst−Npa) as LAtarget_i.

As described above, the operation process constituting the algorithms described in the first to sixth embodiments can be variously replaced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system that is connectable to a host, comprising:
a first memory that is a non-volatile memory;
a controller that associates each of a first number of consecutive logical addresses with each of a first number of physical addresses in a one-to-one manner and updates a correspondence between the first number of consecutive logical addresses and the first number of physical addresses, the first number of physical addresses being included in a second number of consecutive physical addresses of the first memory, the second number being at least one more than the first number; and
a second memory that stores distance information and origin information indicating a physical address associated with a head logical address among the first number of consecutive logical addresses,
wherein a process of updating the correspondence includes:
a first updating of associating a first physical address among the second number of physical addresses with a first logical address of the first number of consecutive logical addresses, and
a second updating of obtaining, after the first updating, a second logical address which is away from the first logical address by a value corresponding to the distance information among the first number of consecutive logical addresses based on the origin information and the distance information and associating a second physical address among the second number of physical addresses with the second logical address, and
the second physical address is a physical address which had been associated with the first logical address before the first updating is executed.

2. The memory system according to claim 1,
wherein the process of updating the correspondence includes one or more third updatings,
each of the one or more third updatings is a process of obtaining a third logical address among the first number of consecutive logical addresses based on the origin information and the distance information and associating a third physical address among the second number of physical addresses with the third logical address,
the third logical address is a logical address which is away from a fourth logical address by a value corresponding to the distance information,
the fourth logical address is a logical address which was a target of a previous updating among the first number of consecutive logical addresses, and the third physical address is a physical address which had been associated with the fourth logical address before the previous updating.

3. The memory system according to claim 2, wherein the controller counts a third number which is a number of times of executed updatings, and the controller calculates, when specifying an access destination, based on a fifth logical address indicating the access destination and the distance information, a fourth number which is a number of updatings required until the fifth logical address is updated, obtains, when the fourth number is larger than the third number, a fourth physical address associated with the fifth logical address based on the fifth logical address and the origin information, and obtains, when the fourth number is smaller than the third number, the fourth physical address based on the fifth logical address, the origin information, and the distance information.

4. The memory system according to claim 3, wherein the controller obtains a fifth number in each of the third updatings by performing, on the first number, subtraction of the origin information and addition of the distance information for each execution of updating, obtains a first remainder by performing dividing the fifth number by the second number, and obtains the third logical address based on the first remainder, and the controller obtains a quotient and a second remainder by performing dividing the fifth logical address by the distance information and obtains the fourth number based on the quotient and the second remainder.

5. The memory system according to claim 4, wherein the distance information is a divisor of the first number of consecutive logical addresses.

6. The memory system according to claim 5, wherein each of the distance information and the first number is a power of 2.

7. The memory system according to claim 2, wherein the controller obtains a fifth number by performing subtraction of the origin information and addition of the distance information for each execution of updating on the first number of consecutive logical addresses, obtains a first remainder by performing dividing the fifth number by the second number, and obtains the third logical address based on the first remainder.

8. The memory system according to claim 2, wherein the controller updates the origin information when the updating of the correspondence for all of the first number of consecutive logical addresses is completed.

9. The memory system according to claim 2, wherein the controller determines whether or not the third logical address is invalid, and the controller migrates, when the third logical address is not invalid, data stored at a location indicated by a fifth physical address to a location indicated by the third physical address, and the fifth physical address is a physical address which had been associated with the third logical address before the third physical address is associated with the third logical address, and the controller does not perform the migrating of the data when the third logical address is invalid.

10. The memory system according to claim 3, wherein the controller updates the distance information when the updating of the correspondence for all of the first number of consecutive logical addresses is completed.

11. A method of controlling a memory system that is connectable to a host and includes a non-volatile memory, the method comprising:

associating each of a first number of consecutive logical addresses with each of a first number of physical addresses in a one-to-one manner, the first number of physical addresses being included in a second number of consecutive physical addresses of the memory, the second number being at least one more than the first number; and updating a correspondence between the first number of consecutive logical addresses and the first number of physical addresses, the updating the correspondence including a first updating and a second updating; and storing distance information and origin information indicating a physical address associated with a head logical address among the first number of consecutive logical addresses, wherein the first updating includes associating a first physical address among the second number of physical addresses with a first logical address of the first number of consecutive logical addresses, and the second updating includes obtaining, after the first updating, based on the origin information and the distance information, a second logical address which is away from the first logical address by a value corresponding to the distance information among the first number of consecutive logical addresses and associating a second physical address among the second number of physical addresses with the second logical address, the second physical address being a physical address which had been associated with the head logical address before the first updating is executed.

12. The method according to claim 11, wherein the updating the correspondence includes one or more third updatings, each of the one or more third updatings includes obtaining a third logical address among the first number of consecutive logical addresses based on the origin information and the distance information and associating a third physical address among the second number of physical addresses with the third logical address, the third logical address is a logical address which is away from a fourth logical address by a value corresponding to the distance information, the fourth logical address is a logical address which was a target of a previous updating among the first number of consecutive logical addresses, and the third physical address is a physical address which had been associated with the fourth logical address before the previous updating.

13. The method according to claim 12, further comprising:

counting a third number which is a number of times of executed updatings;

calculating, based on a fifth logical address indicating an access destination and the distance information, a fourth number which is a number of times of updatings required until the fifth logical address is updated;

obtaining, when the fourth number is larger than the third number, a fourth physical address associated with the fifth logical address based on the fifth logical address and the origin information; and obtaining, when the fourth number is smaller than the third number, the fourth physical address based on the fifth logical address, the origin information, and the distance information.

14. The method according to claim 13, wherein each of the third updatings further comprises
    obtaining a fifth number by performing, on the first number, subtraction of the origin information and addition of the distance information for each execution of updating, and
    obtaining a first remainder by performing dividing the fifth number by the second number, and obtaining the third logical address based on the first remainder, and
the method further comprises
    obtaining a quotient by performing dividing the fifth logical address by the distance information and a second remainder and obtaining the fourth number based on the quotient and the second remainder.

15. The method according to claim 14, wherein the distance information is a divisor of the first number of consecutive logical addresses.

16. The method according to claim 15, wherein each of the distance information and the first number is a power of 2.

17. The method according to claim 12, further comprising:
    obtaining a fifth number by performing, on the first number of consecutive logical addresses, subtraction of the origin information and addition of the distance information for each execution of updating;
    obtaining a first remainder by performing dividing the fifth number by the second number; and
    obtaining the third logical address based on the first remainder.

18. The method according to claim 12, further comprising,
    updating the origin information when the updating of the correspondence for all of the first number of consecutive logical addresses is completed.

19. The method according to claim 12, further comprising:
    determining whether or not the third logical address is invalid;
    migrating, when the third logical address is not invalid, data stored at a location indicated by a fifth physical address to a location indicated by the third physical address, the fifth physical address being a physical address which had been associated with the third logical address before the third physical address is associated with the third logical address; and
    not performing the migrating of the data when the third logical address is invalid.

20. The method according to claim 13, further comprising,
    updating the distance information when the updating of the correspondence for all of the first number of consecutive logical addresses is completed.

* * * * *